May 6, 1930. A. T. KILLIAN 1,757,199
ROLLER BEARING
Filed Oct. 30, 1926
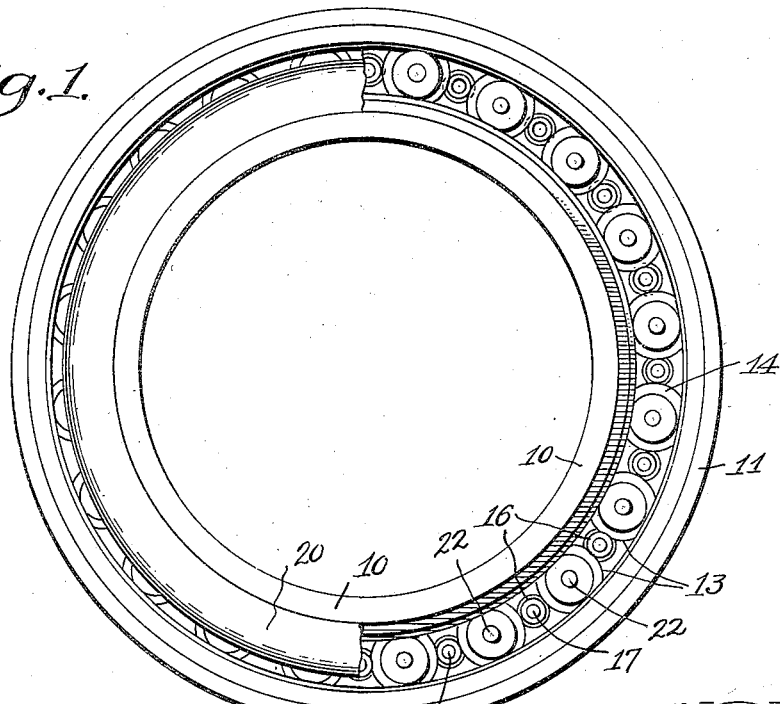
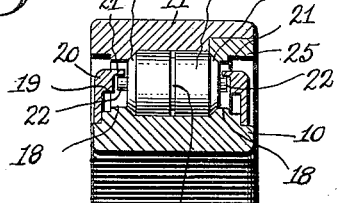
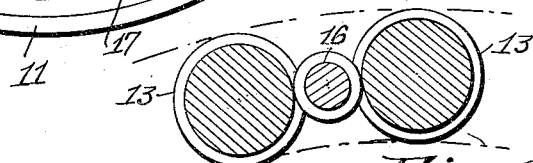
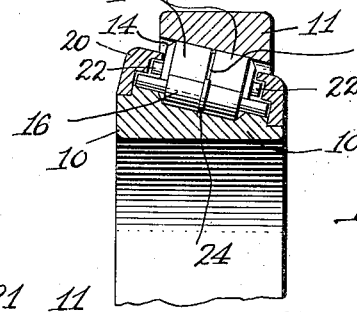
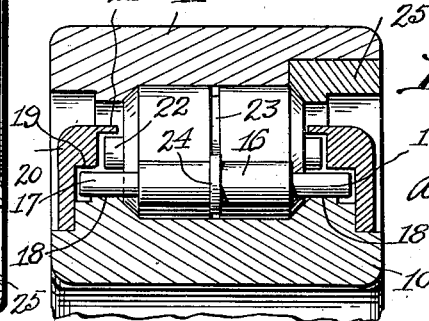

Patented May 6, 1930

1,757,199

UNITED STATES PATENT OFFICE

ALBERT T. KILLIAN, OF UPPER DARBY, PENNSYLVANIA, ASSIGNOR TO KILLIAN ROLLER BEARING COMPANY, OF PHILADELPHIA, PENNSYLVANIA, A CORPORATION OF PENNSYLVANIA

ROLLER BEARING

Application filed October 30, 1926. Serial No. 145,219.

This invention has relation to that type of roller bearing in which a series of large rollers takes the radial load-strain and is maintained in separated positions by means of a series of smaller, intermediate rollers, as more fully hereinafter set forth; and the object of the invention is to provide simple means whereby both sets of rollers will be prevented from twisting or disalining.

In the drawing—

Fig. 1 is a side elevation of a roller bearing constructed in accordance with my invention, one of the track flanges being broken away;

Fig. 2 is a transverse section through the structure shown in Fig. 1;

Fig. 3 is a sectional view of another form of the bearing;

Figs. 4 and 5 are detail views showing specific features of the device.

Referring to the drawing by reference-characters, 10 designates the inner ring of the bearing and 11 the outer ring thereof, the adjacent faces of these rings being provided with track faces for the large load-rollers 13, the ends of these rollers being bevelled at 14 to adapt them to run on correspondingly-bevelled shoulders on the trackways for the purpose of taking up end-thrusts.

The smaller, intermediate separating rollers are designated by numeral 16, the ends or trunnions 17 of these spacing-rollers running on annular flange-tracks 18 formed on the inner ring 10 and also on companion tracks 19 formed on ring-like track-flanges 20 movably attached to the inner ring. These movable track-flanges 20 are provided also with an additional set of track-faces 21 which serve to hold the load-rollers assembled on the inner ring when the outer ring has been removed.

To maintain the two sets of rollers in alinement and thus prevent twisting, I provide each of the load-rollers with an annular groove 23 about midway its ends, and each of the spacing-rollers is provided with an annular flange or collar 24 adapted to work in the grooves 23 in the two adjacent load-rollers. Throughout the series of rollers, the flanges 24 at all times work in the grooves or channels 23 and thus tie the entire set of rollers together and prevent any roller having any independent endwise movement and also prevent the rolls from skewing to a position out of alinement with each other on the tracks. In this way, friction is kept down to the utmost minimum.

When taper or conical rollers are used, as shown in Fig. 3, the angle of the bearing-faces on the inner and outer rings is designed to coincide with the taper on the rollers, thereby making use of shoulders on the outer sleeve 11 unnecessary. The angle of the bevel on the ends of the large rollers and the inner faces of the tracks 18 on the inner ring will be designed to meet the requirements of the taper on the rollers. The tracks on the end-caps or track-rings 20 for the trunnions of the smaller rollers will remain parallel, whether straight or conical rollers are used.

The body of the small roller 16 may remain the same diameter its entire length excepting where the collar or flange 24 is formed, but it is preferable to enlarge the body, as shown, where it comes in contact with the large rollers, since by increasing or decreasing said enlarged portions of the rollers the pitch diameters of both sets of rollers would be changed to suit conditions without altering the size of the trunnions of the small rollers 11. This is a material advantage in view of the fact that to change the diameter of the trunnions would also make it necessary to change the end-caps and tracks on the inner sleeve.

If it be necessary to take side-play or end-thrust on the load-rollers in both directions, as in the example illustrated, one of these flanges may be formed on a removable ring 25 pressed tightly into a rabbet formed in the inner surface of the outer ring.

It is important that the groove 23 shall be in the load-roller and not in the spacing-roller, as this load-roller must be made by grinding and it would be difficult, if not impossible, to accurately make the rib 24 in this manner. It is also important that the groove 23 and its companion rib 24 shall be rectangular in cross-section, so that end-thrust on either the spacing-roller or the load-roller will not have any camming action that would disalign the rollers and possibly ruin or render inoperative the bearing. It is also desirable that the rib and groove shall be relieved of end-thrust by other devices, such, for instance, as the bevel surfaces at the ends of the load-rollers, which, as shown, abut against similarly-beveled surfaces on the rings. It is also important that the tracks 18 and 19 shall be so positioned that the spacing-roller 16 shall always (i. e., whether running over the top of the bearings or under the lower side) remain approximately midway between the bearings of the load-rollers, with its axis in a straight line with the axes of the two adjacent load-rollers, so that there will be no appreciable tendency to jam the spacing-roller outwardly or inwardly.

What I claim as new is:

A roller bearing embodying an outer ring provided with a load-roller-track, an inner ring provided with a companion load-roller-track, the tracks and the load-roller having co-acting bevel surfaces to take up end-thrust, a series of spacing-rollers one between each pair of load-rollers and each provided with a pair of trunnions, and means affording a pair of companion tracks for said trunnions, the tracks being so located that the spacing-rollers will be held each with its axis in a straight line with the axes of the two adjoining load-rollers, each of said load-rollers being provided with an annular groove rectangular in cross-section, and each of the spacing-rollers being provided with a similarly-shaped rib fitting and running in the grooves in the adjacent load-rollers.

In testimony whereof I hereunto affix my signature.

ALBERT T. KILLIAN.